United States Patent
Chou et al.

(10) Patent No.: US 10,004,018 B2
(45) Date of Patent: Jun. 19, 2018

(54) METHOD AND COMMUNICATIONS APPARATUS FOR PERFORMING A CELL RESELECTION PROCESS

(71) Applicant: MediaTek Inc., Hsin-Chu (TW)

(72) Inventors: Shuang-An Chou, Keelung (TW); Tsung-Liang Lu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 220 days.

(21) Appl. No.: 14/974,303

(22) Filed: Dec. 18, 2015

(65) Prior Publication Data
US 2017/0181049 A1 Jun. 22, 2017

(51) Int. Cl.
*H04W 36/16* (2009.01)
*H04W 48/20* (2009.01)
*H04W 48/16* (2009.01)

(52) U.S. Cl.
CPC .......... *H04W 36/16* (2013.01); *H04W 48/20* (2013.01); *H04W 48/16* (2013.01)

(58) Field of Classification Search
CPC ............. H04W 36/16; H04W 36/0005; H04W 36/0083
See application file for complete search history.

(56) References Cited

U.S. PATENT DOCUMENTS

| | | | | |
|---|---|---|---|---|
| 6,014,565 A * | 1/2000 | Bonta | ............... | H04W 16/18 455/437 |
| 2003/0125039 A1* | 7/2003 | Lachtar | ............... | H04W 72/02 455/453 |
| 2007/0142051 A1* | 6/2007 | Xu | ............... | H04W 36/12 455/436 |
| 2007/0232302 A1* | 10/2007 | Aminov | ............... | H04W 36/36 455/433 |
| 2008/0064401 A1* | 3/2008 | Forssell | ............... | H04W 36/04 455/436 |
| 2010/0120371 A1* | 5/2010 | Sato | ............... | H04W 24/06 455/67.14 |
| 2016/0044539 A1* | 2/2016 | Yiu | ............... | H04W 36/26 370/235 |

* cited by examiner

*Primary Examiner* — Christine Ng
(74) *Attorney, Agent, or Firm* — McClure, Qualey & Rodack, LLP

(57) ABSTRACT

A method for performing a cell reselection process in a wireless communications system is provided. The method is used in a communications apparatus camping on a serving cell. The method includes: receiving priority information about a priority order of frequencies of candidate cells from a network operator; performing a cell reselection evaluation process to select a target cell from the serving cell and the candidate cells; and performing a cell reselection process from the serving cell to the target cell directly without passing through any intervening cell.

14 Claims, 8 Drawing Sheets

METHOD AND COMMUNICATIONS APPARATUS FOR PERFORMING A CELL RESELECTION PROCESS

BACKGROUND OF THE INVENTION

Field of the Invention

Aspects of the present invention relate generally to wireless communications systems, and more particularly, to a method and communications apparatus for performing a cell reselection process in a wireless communications system.

Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly used communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network. The LTE (Long Term Evolution) and the LTE-Advanced evolved from the LTE is a 4G mobile communications system, which provides high-speed data transmission over the 2G and 3G systems.

In general, if power to a communications apparatus is turned on, the communications apparatus searches the cells of a Public Land Mobile Network (PLMN), selects a cell, connects to a communication network of the selected cell, and adjusts a channel. If the communications apparatus camps on one or more cells in a power-on state, the communications apparatus searches for the cell which can provide a better signal than that of a serving cell and performs a cell reselection process.

The cell reselection process of the communications apparatus is a process of selecting a cell with better conditions than those of the serving cell based on a radio wave measurement or a priority-based reselection (PBR) algorithm of an idle state. The cell reselection process of the communications apparatus may allow the communications apparatus to reselect an ambient cell that satisfies the PBR algorithm among suitable cells.

That is, if the communications apparatus does not receive a service from a serving cell which exists currently, or if the communications apparatus discovers a better cell than a current serving cell, the communications apparatus performs a cell reselection process to a neighbor cell to maintain smooth service.

The cell reselection process is performed based on the PBR algorithm. In some situations, the communications apparatus performs an unnecessary cell reselection process. For example, the communications apparatus reselects from cell A to cell B, but immediately reselects to cell C. That is cell A→cell B→cell C. Cell B may be an intervening cell through which the communications apparatus passes to camp on cell C, which is the target cell. A cell reselection process to cell B may be unnecessary. The cause of this situation is that the communications apparatus may perform the cell reselection process according to signal strengths or signal quality when the communications apparatus does not receive a priority order defined by a network operator from the network, or the communications apparatus may perform the cell reselection process according to the priority order but the signal strength or the signal quality of the higher priority cell is very bad or an evaluation time of the higher priority cell is not satisfied. For this reason, there is a problem in that power consumption of the communications apparatus may occur due to the unnecessary cell reselection process.

Accordingly, in order to solve the problems, a communications apparatus and method for performing a cell reselection process is needed.

BRIEF SUMMARY OF THE INVENTION

In a preferred embodiment, the invention is directed to a communications apparatus for performing a cell reselection process in a wireless communications system. The communications apparatus camps on a serving cell and comprises a control circuit, a processor installed in the control circuit, and a memory installed in the control circuit and operatively coupled to the processor. The processor is configured to execute a program code stored in the memory by: receiving priority information about a priority order of frequencies of candidate cells from a network operator; performing a cell reselection evaluation process to select a target cell from the serving cell and the candidate cells; and performing a cell reselection process from the serving cell to the target cell directly without passing through any intervening cell.

In some embodiments, the cell reselection evaluation process comprises: selecting a first candidate cell as the target cell, wherein a frequency of the first candidate cell has a highest priority in the priority order; and extending an evaluation time of one or more low priority candidate cell(s), wherein the evaluation time(s) of the low priority candidate cell(s) is longer than that of the target cell. In some embodiments, the cell reselection evaluation process comprises: selecting a first candidate cell as the target cell, wherein a frequency of the first candidate cell has a highest priority in the priority order; and shortening an evaluation time of the first candidate cell, wherein the evaluation time of the target cell is shorter than one of evaluation times of the low priority candidate cells. In some embodiments, the cell reselection evaluation process comprises: selecting a first candidate cell as the target cell, wherein a frequency of the first candidate cell has a highest priority in the priority order; and aligning an evaluation time of each candidate cell, wherein the evaluation time of each candidate cell is adjusted according to the priority order. In some embodiments, before the step of performing the cell reselection evaluation process, the processor further measures signal characteristics of the candidate cells, and the cell reselection evaluation process comprises: simulating that the communications apparatus camps on a first candidate cell while still camping on the serving cell; evaluating a cell reselection result according to the priority order and cell reselection information; and determining the target cell according to the cell reselection result. In some embodiments, the cell reselection information includes a threshold value of each candidate cell, the step of evaluating the cell reselection result further comprises: evaluating whether the cell reselection process from the first candidate cell to a second candidate cell may occur; determining whether a first signal characteristic of the first candidate cell falls below a first threshold value and determining whether a second signal characteristic of the second candidate cell exceeds a second threshold value, respectively, according to the priority order; and determining whether the second candidate cell is the target cell according to the determining result. In some embodiments, before determining whether the second candidate cell is the target cell, the step of evaluating the cell reselection result further comprises: determining whether a first evaluation time of the first candidate cell is satisfied and determining whether a second evaluation time of the second candidate cell is satisfied, respectively. In some embodiments, before determining whether the second candidate cell is the target cell, the step of evaluating the cell reselection result further comprises: determining whether a first evaluation time of the first candidate cell is satisfied and determining whether a second evaluation time of the second candidate cell is satisfied, respectively. In some embodiments, the cell reselection information is received from the candidate cells in advance while camping on the candidate cells. In some embodiments, before the step of performing the cell reselection evaluation process, the processor further executes at least one of the following steps: receiving the cell reselection information included in system information from the serving cell. In some embodiments, the candidate cells include the serving cell, and the target cell is the serving cell.

In a preferred embodiment, the invention is directed to a method for performing a cell reselection process in a wireless communications system, the method is used in a communications apparatus camping on a serving cell, comprising: receiving priority information about a priority order of frequencies of candidate cells from a network operator; performing a cell reselection evaluation process to select a target cell from the serving cell and the candidate cells; and performing a cell reselection process from the serving cell to the target cell directly without passing through any intervening cell.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
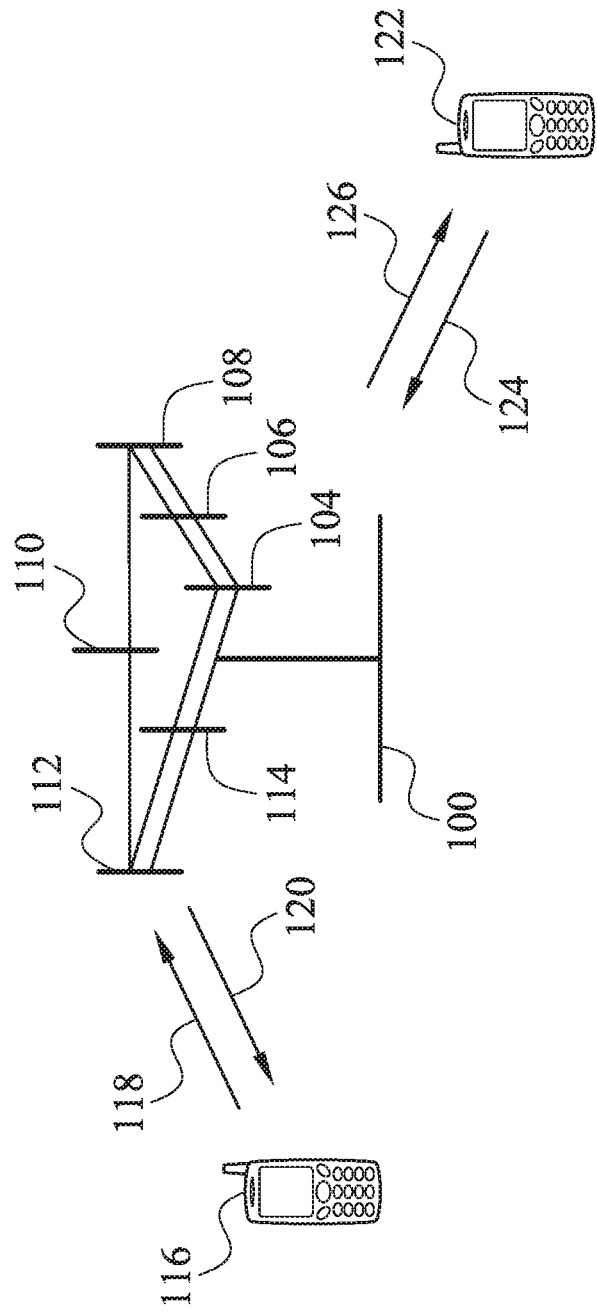
FIG. 1 shows a multiple access wireless communications system according to one embodiment of the invention.

Several exemplary embodiments of the present invention are described with reference to FIGS. 1 through 7B, which generally relate to a communication apparatus, and a method for performing a cell reselection process in a wireless communications system. It should be understood that the following invention provides various embodiments as examples for implementing different features of the present invention. Specific examples of components and arrangements are described in the following to simplify the present invention. These are, of course, merely examples and are not intended to be limiting. In addition, the present invention may repeat reference numerals and/or letters in the various examples. This repetition is for the purpose of simplicity and clarity and does not in itself dictate a relationship between the various described embodiments and/or configurations.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

FIG. 1 shows a multiple access wireless communications system according to one embodiment of the invention. An access network 100 (AN) includes multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication apparatus, terminal, access terminal or some other terminology.

Figure 2:
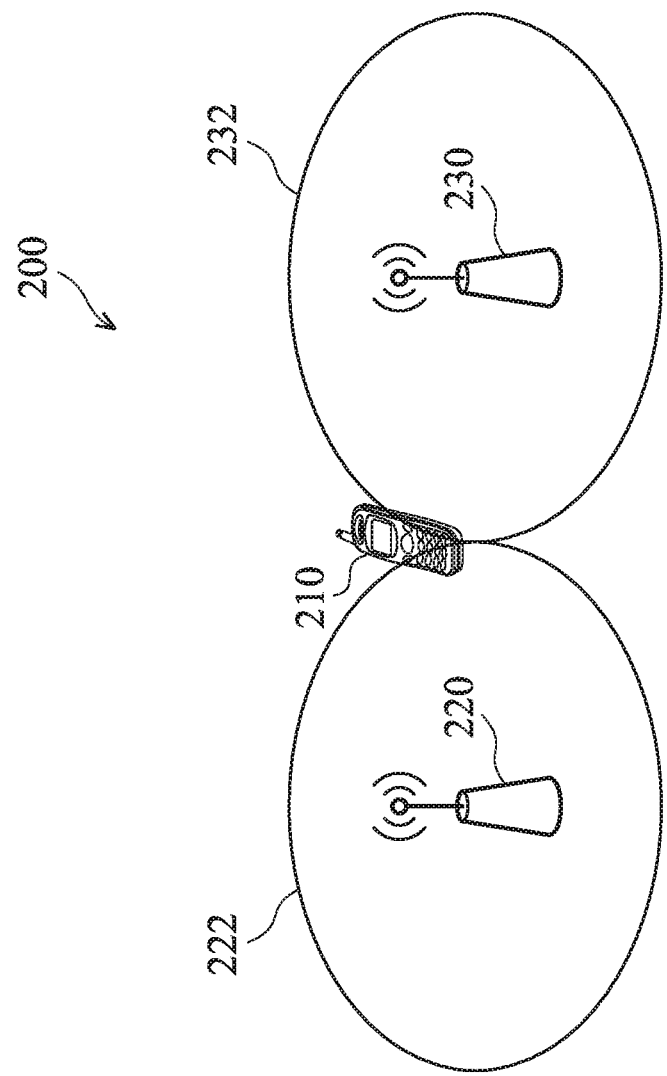
FIG. 2 illustrates another example multiple access wireless communications system according to one embodiment of the invention.

FIG. 2 illustrates another example multiple access wireless communications system 200 according to one embodiment of the invention. As shown, the multiple access wireless communications system 200 includes an UE 210, and an Evolved Node B (eNB) 220 serving a cell 222 (i.e., a LTE coverage), and a base station (BS) 230 serving a cell 232 (i.e., a GSM coverage). The UE 210 may be capable of communicating via multiple radio access technologies (RATs), and may be located within a coverage area of cells of multiple frequencies and/or multiple RATs.

Figure 3:
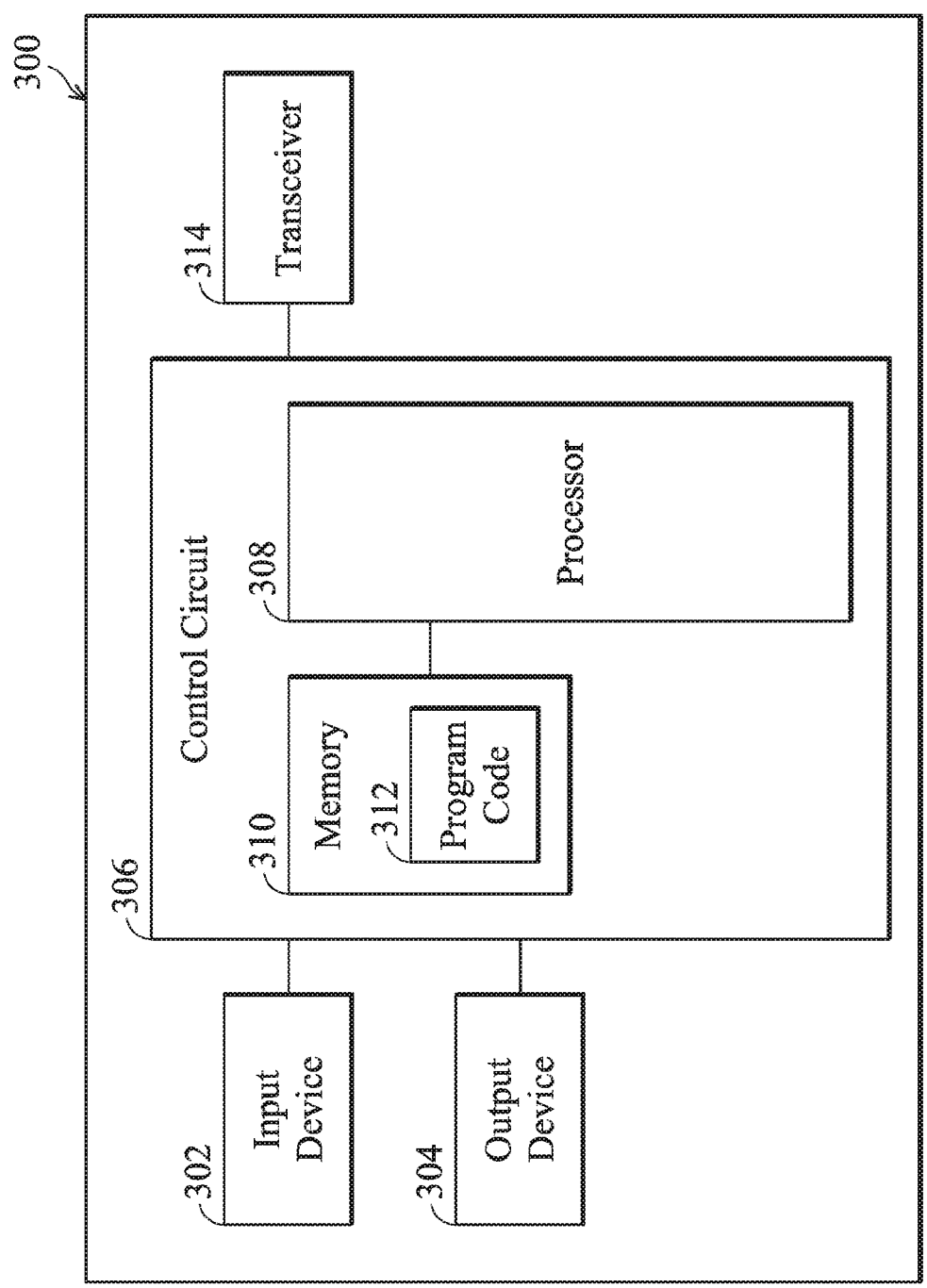
FIG. 3 is a functional block diagram of a communication apparatus according to one exemplary embodiment.

FIG. 3 is a functional block diagram of a communication apparatus 300 according to one embodiment of the invention. As shown in FIG. 3, the communication apparatus 300 in a wireless communication system can be utilized for realizing the UEs (or ATs) 116 and 122 in FIG. 1 or the UE 210 in FIG. 2. The communication apparatus 300 may include an input device 302, an output device 304, a control circuit 306, a processor 308 (which may be referred to as a central processor unit (CPU)), a memory 310, a program code 312, and a transceiver 314. The control circuit 306 executes the program code 312 in the memory 310 through the processor 308, thereby controlling the operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
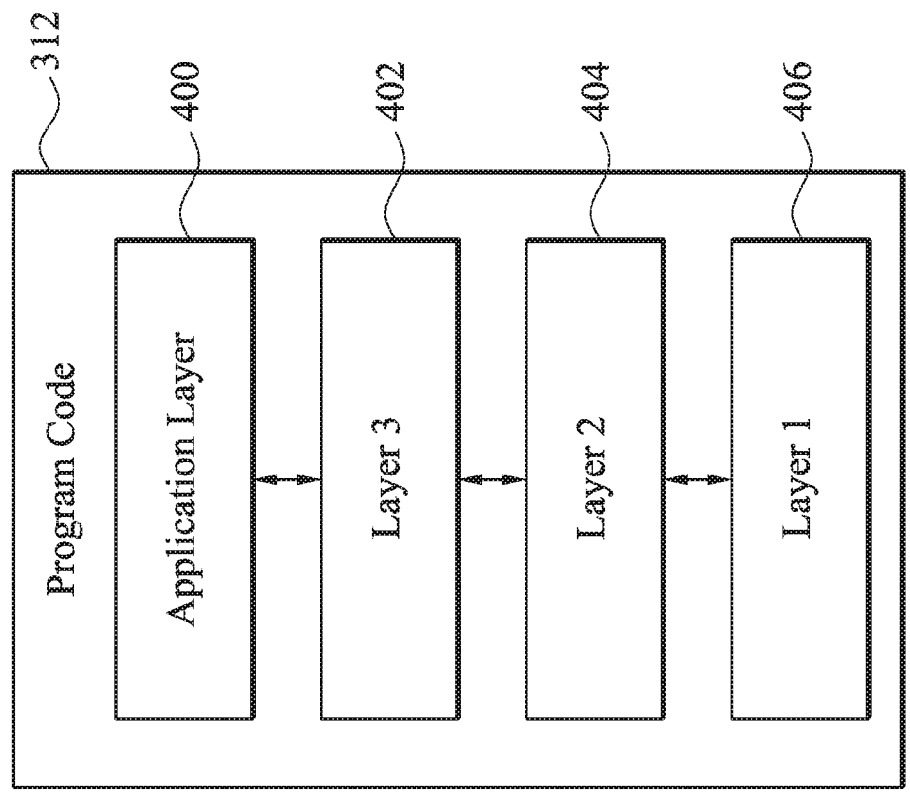
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, a Layer 2 portion 404, and a Layer 1 portion 406. The Layer 3 portion 402 generally performs radio resource control. The Layer 2 portion 404 generally performs link control. The Layer 1 portion 406 generally performs physical connections.

Figure 5:
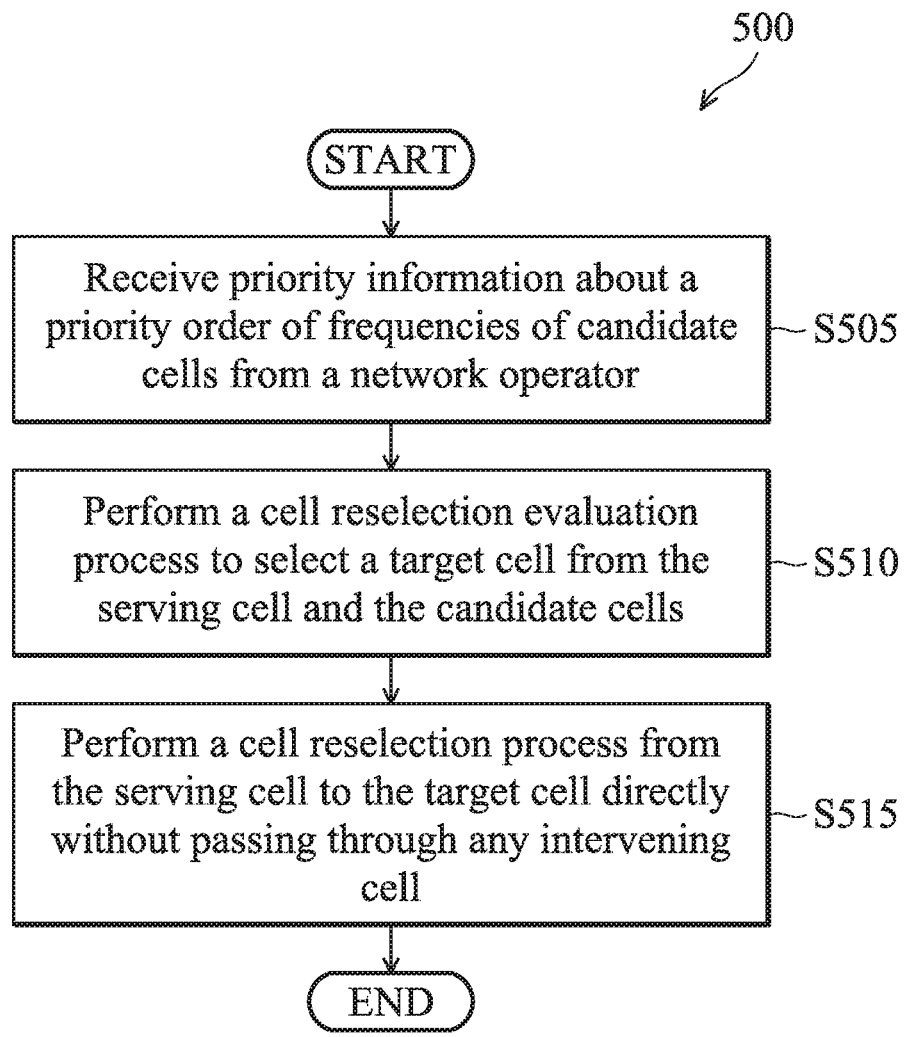
FIG. 5 is a flow chart illustrating a method for performing a cell reselection process in a wireless communications system according to an embodiment of the invention with reference to the communication apparatus in FIG. 3.

FIG. 5 is a flow chart 500 illustrating a method for performing a cell reselection process in a wireless communications system according to an embodiment of the invention with reference to the communication apparatus in FIG. 3. In the embodiment, the method is used in the communications apparatus camping on a serving cell. As shown in FIG. 5, in step S505, the processor receives priority information about a priority order of frequencies of candidate cells from a network operator, wherein the priority order stands for a dedicated priority order defined by the network operator. Next, in step S510, the processor performs a cell reselection evaluation process to select a target cell from the serving cell and the candidate cells. In step S515, the processor performs a cell reselection process from the serving cell to the target cell directly without passing through any intervening cell.

It should be noted that the candidate cells may include the serving cell. More specifically, the target cell can be the serving cell, which means that the processor select the serving cell as a target cell after performing the cell reselection evaluation process. Therefore, the processor does not need to perform the cell reselection process. Note that, it does not mean the situation where, since there is only one serving cell and no candidate cell, the processor should perform the cell reselection evaluation process to select back to the serving cell.

In an embodiment of the invention, the processor may store cell reselection information in advance before step S510, wherein the cell reselection information at least includes a threshold value of each candidate cell, wherein the threshold value of each candidate cell represents a criterion for the communication apparatus to determine whether to trigger a cell reselection or to perform a measurement. The cell reselection information can be received from the candidate cells in advance while camping on the candidate cells. In another embodiment, the processor may receive system information including the cell reselection information and cell reselection criteria from the serving cell.

Returning to FIG. 5, the cell reselection evaluation process in step S510 may be one of several different processes optionally performed by the processor, as will be discussed below (for example, Processes I-V and/or others).

Process I: the processor of the communications apparatus selects a first candidate cell as the target cell, wherein a frequency of the first candidate cell has a highest priority in the priority order. The processor may extend an evaluation time of one or more low priority candidate cell(s), wherein the evaluation time(s) of the low priority candidate cell(s) is longer than that of the target cell. Therefore, an evaluation time of the target cell is shorter than the evaluation time of other low priority candidate cell(s). The processor may perform the cell reselection process from the serving cell to the target cell directly.

Process II: the processor of the communications apparatus selects a first candidate cell as the target cell, wherein a frequency of the first candidate cell has a highest priority in the priority order. The processor may shorten an evaluation time of the first candidate cell, wherein the evaluation time of the target cell is shorter than one of evaluation times of the low priority candidate cells. Therefore, an evaluation time of the target cell is shorter than one of the evaluation times of the low priority candidate cells. The processor may perform the cell reselection process from the serving cell to the target cell directly.

Process III: the processor of the communications apparatus selects a first candidate cell as the target cell, wherein a frequency of the first candidate cell has a highest priority in the priority order. The processor may align an evaluation time of each candidate cell, wherein the evaluation time of each candidate cell is adjusted according to the priority order. For example, a first evaluation time aligned to a first candidate cell expires at the same time as a second evaluation time aligned to a second candidate cell. Therefore, the processor may perform the cell reselection process from the serving cell to the target cell directly.

Process IV: the processor may simulate that the communications apparatus camps on a first candidate cell while still camping on the serving cell. Then, the processor evaluates a cell reselection result according to the priority order and cell reselection information. After evaluating the cell reselection result, the processor determines the target cell according to the cell reselection result. In another embodiment, before performing the cell reselection evaluation process, the processor further measures signal characteristics, wherein the signal characteristics can indicate signal strengths, or signal quality of the candidate cells, or the like.

In one embodiment, the cell reselection information may include a threshold value of each candidate cell, and the details of evaluating the cell reselection result can be further described below. First, the processor evaluates whether the cell reselection process from the first candidate cell to a second candidate cell may occur. Then, the processor determines whether a first signal characteristic of the first candidate cell falls below a first threshold value and determines whether a second signal characteristic of the second candidate cell exceeds a second threshold value, respectively, according to the priority order after evaluating that the cell reselection process from the first candidate cell to a second candidate cell may occur. The processor determines whether the second candidate cell is the target cell according to the determining result.

In another embodiment, after determining whether the signal strength of the first candidate cell exceeds the first threshold value and determines whether the second signal strength of the second candidate cell exceeds the second threshold value, respectively, the processor may further determine whether a first evaluation time of the first candidate cell is satisfied and determine whether a second evaluation time of the second candidate cell is satisfied, respectively.

In another embodiment, when the cell reselection information and the priority order are not stored in the memory of the communications apparatus, the processor may perform a priority-based reselection (PBR) operation in 3GPP Technical Specification.

Figure 6:
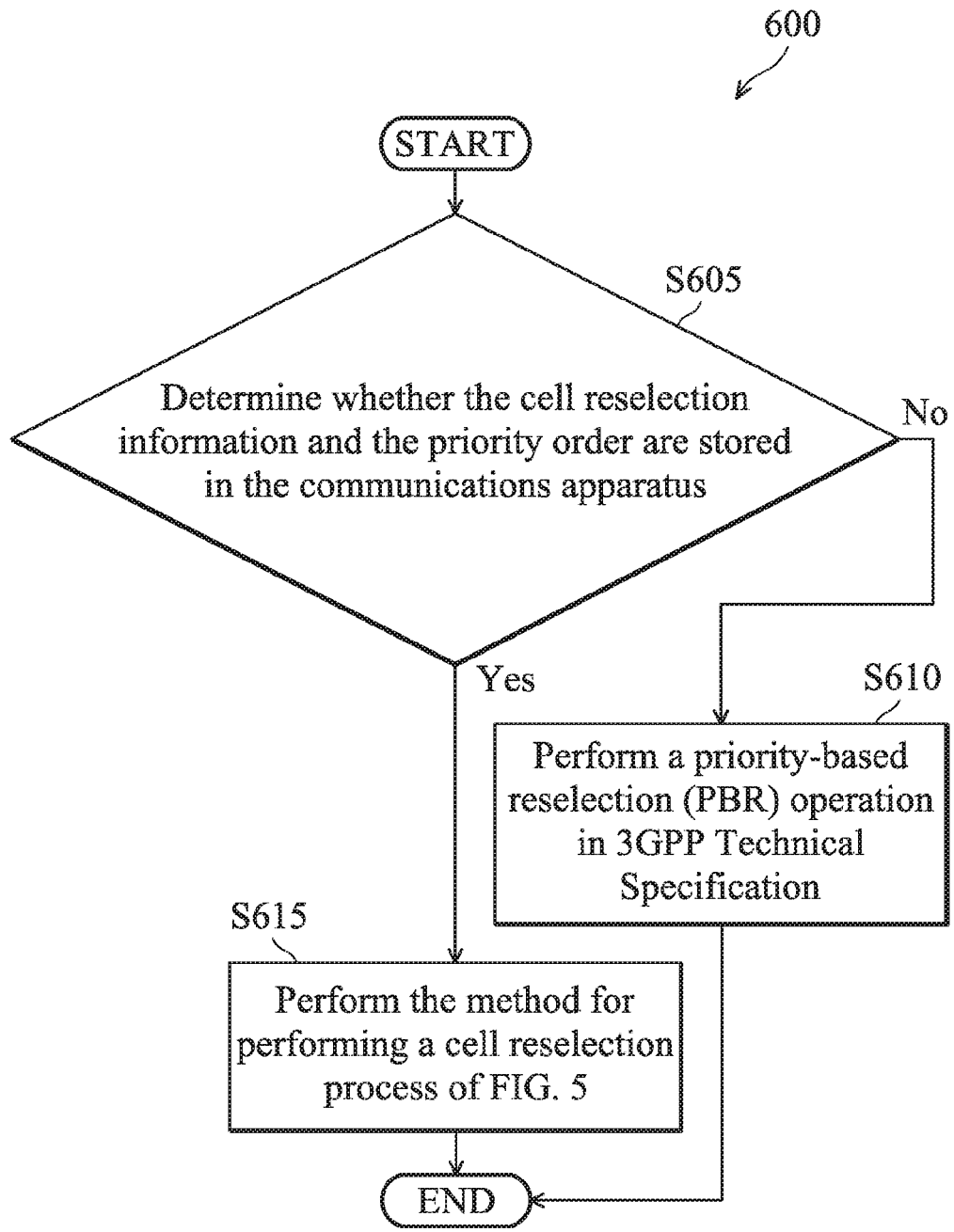
FIG. 6 is a flow chart illustrating whether the communication apparatus performs the method for performing a cell reselection process of FIG. 5 according to an embodiment of the invention.

FIG. 6 is a flow chart 600 illustrating whether the communication apparatus performs the method for performing a cell reselection process of FIG. 5 according to an embodiment of the invention. In S605, the processor of the communications apparatus may determine whether the cell reselection information and the priority order are stored in the communications apparatus. When the processor determines the cell reselection information and the priority order are not stored in the communications apparatus ("No" in step S605), in step S610, the processor may perform a priority-based reselection (PBR) operation in 3GPP Technical Specification. Otherwise, in step S615, the processor may perform the method for performing a cell reselection process of FIG. 5.

In another embodiment, when there is more than one candidate cell suitable to be the target cell after the cell reselection evaluation process of Process V, the communications apparatus selects a cell having a highest priority from the more than one candidate cell(s) as the target cell according to the priority order.

In addition, the processor 308 of FIG. 3 can execute the program code 312 to perform all of the above-described actions and steps or others described herein.

Figure 7A:
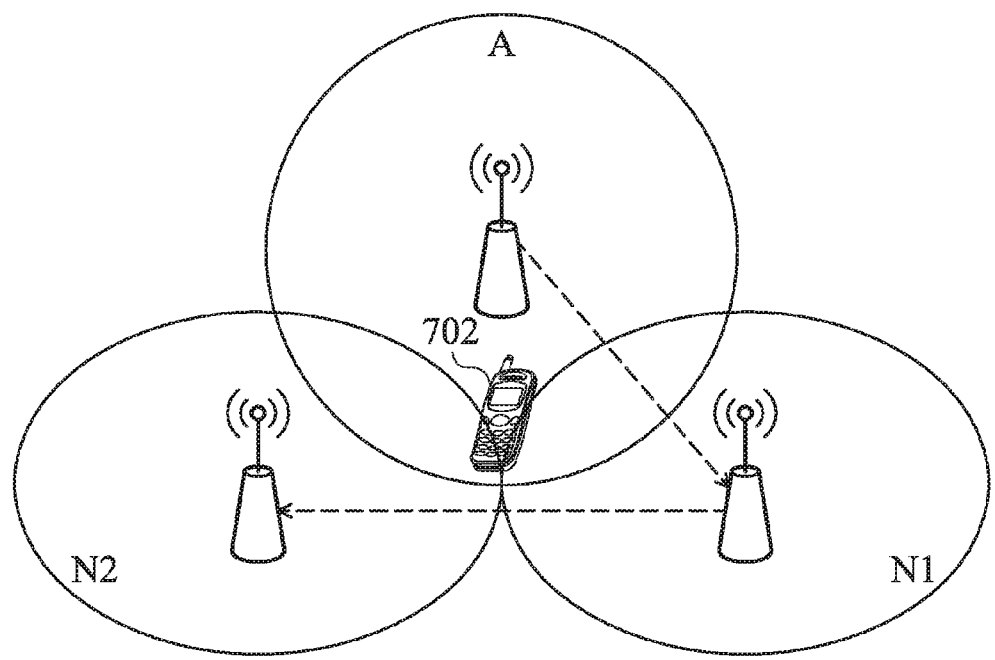
FIGS. 7A-7B are schematic diagrams illustrating how to determine the target cell by using Process V in a wireless communications system according to one embodiment of the present invention.
Figure 7B:
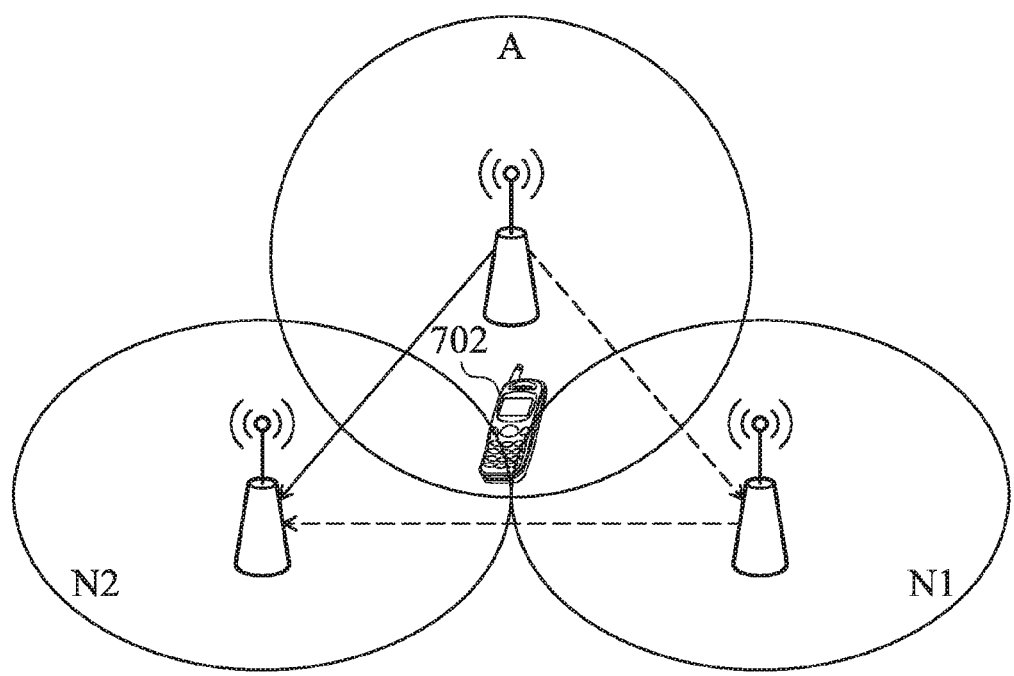

FIGS. 7A-7B are schematic diagrams illustrating how to determine the target cell by using Process V in a wireless communications system according to one embodiment of the present invention. A communications apparatus 702 is camped on a serving cell A. A cell N1 and a cell N2 are candidate cells recorded in a priority order. Two cases 1, 2 can be given in the embodiment. In case 1, the priority order is the cell N2>the cell N1. In case 2, the priority order is the cell N1>the cell N2.

In addition, the processor of the communications apparatus 702 can measure signal strengths of the candidate cells in advance. It should be noted that the candidate cells can belong to different radio access technologies (RATs).

In case 1, the processor of the communications apparatus 702 simulates that the communications apparatus 702 camps on the cell N1 while still camping on the serving cell A and evaluates that the cell reselection process from the cell N1 to the cell N2 may occur (the dotted line in FIG. 7A). Because the priority of a frequency of the cell N2 is higher than the priority of a frequency of the cell N1, the processor determines whether a signal strength of the cell N2 exceeds a threshold value of the cell N2. When determining that the signal strength of the cell N2 exceeds the threshold value of the cell N2, the processor determines that the cell N2 is the target cell. In another embodiment, the processor can further determine whether the signal strength of the cell N2 exceeds the threshold value of the cell N2 and whether an evaluation time of the cell N2 is satisfied. When determining that the signal strength of the cell N2 exceeds the threshold value of the cell N2 and the evaluation time of the cell N2 is satisfied, the processor determines that the cell N2 is the target cell. Therefore, the processor performs the cell reselection process from the serving cell A to the cell N2 directly without passing through the cell N1 (the solid line in FIG. 7B).

In case 2, the processor of the communications apparatus 702 simulates that the communications apparatus 702 camps on the cell N1 while still camping on the serving cell A and evaluates that the cell reselection process from the cell N1 to the cell N2 may occur (the dotted line in FIG. 7A). Because the priority of a frequency of the cell N1 is higher than the priority of a frequency of the cell N2, the processor determines whether a signal strength of the cell N1 exceeds a threshold value of the cell N1. When determining the signal strength of the cell N1 does not exceed the threshold value of the cell N1, the processor determines whether a signal strength of the cell N2 exceeds a threshold value of the cell N2. When determining that the signal strength of the cell N2 exceeds the threshold value of the cell N2, the processor determines that the cell N2 is the target cell. In another embodiment, the processor can further determine whether the signal strength of the cell N2 exceeds the threshold value of the cell N2 and whether an evaluation time of the cell N2 is satisfied. When determining the signal strength of the cell N2 exceeds the threshold value of the cell N2 and the evaluation time of the cell N2 is satisfied, the processor determines that the cell N2 is the target cell. Therefore, the processor performs the cell reselection process from the serving cell A to the cell N2 directly without passing through the cell N1 (the solid line in FIG. 7B).

As described above, the present invention prevents a cell reselection process to an unnecessary cell. The prevent invention may reduce power consumption through an unnecessary cell reselection process by using a priority order from the network operator or predicting a cell reselection evaluation result of each candidate cell according different information. Therefore, a cell reselection process to the intervening cell can be prevented to improve cell reselection efficiency and the ping-pong cell reselection can also be reduced to save power.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the invention. In some aspects a computer program product may comprise packaging materials.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communications apparatus for performing a cell reselection process in a wireless communications system, camping on a serving cell, comprising:
   a control circuit;
   a processor installed in the control circuit; and
   a memory installed in the control circuit and operatively coupled to the processor;
   wherein the processor is configured to execute a program code stored in the memory by:
   receiving priority information about a priority order of frequencies of candidate cells from a network operator;
   performing a cell reselection evaluation process to select a target cell from the serving cell and the candidate cells; and
   performing a cell reselection process from the serving cell to the target cell directly without passing through any intervening cell,
   wherein the cell reselection evaluation process comprises one of the following operations:
   selecting a first candidate cell as the target cell and extending an evaluation time of one or more low priority candidate cell(s), wherein a frequency of the first candidate cell has the highest priority in the priority order and the evaluation time(s) of the low priority candidate cell(s) is longer than that of the target cell;
   selecting a second candidate cell as the target cell and shortening an evaluation time of the second candidate cell, wherein a frequency of the second candidate cell has the highest priority in the priority order and the evaluation time of the target cell is shorter than one of the evaluation times of the low priority candidate cells; or
   selecting a third candidate cell as the target cell and aligning an evaluation time of each candidate cell, wherein a frequency of the third candidate cell has the highest priority in the priority order and the evaluation time of each candidate cell is adjusted according to the priority order.

2. The communications apparatus as claimed in claim 1, wherein before the step of performing the cell reselection evaluation process, the processor further measures signal characteristics of the candidate cells, and one of the operations further comprises:
  simulating that the communications apparatus camps on a fourth candidate cell while still camping on the serving cell;
  evaluating a cell reselection result according to the priority order and cell reselection information; and
  determining the target cell according to the cell reselection result.

3. The communications apparatus as claimed in claim 2, wherein the cell reselection information includes a threshold value of each candidate cell, the step of evaluating the cell reselection result further comprises:
  evaluating whether the cell reselection process from the fourth candidate cell to a fifth candidate cell may occur;
  determining whether a fourth signal characteristic of the fourth candidate cell falls below a fourth threshold value and determining whether a fifth signal characteristic of the fifth candidate cell exceeds a fifth threshold value, respectively, according to the priority order; and
  determining whether the fifth candidate cell is the target cell according to the determining result.

4. The communications apparatus as claimed in claim 3, wherein before determining whether the fifth candidate cell is the target cell, the step of evaluating the cell reselection result further comprises:
  determining whether a fourth evaluation time of the fourth candidate cell is satisfied and determining whether a fifth evaluation time of the fifth candidate cell is satisfied, respectively.

5. The communications apparatus as claimed in claim 3, wherein the cell reselection information is received from the candidate cells in advance while camping on the candidate cells.

6. The communications apparatus as claimed in claim 3, wherein before the step of performing the cell reselection evaluation process, the processor further executes at least one of the following steps:
  receiving the cell reselection information included in system information from the serving cell.

7. The communications apparatus as claimed in claim 1, wherein the candidate cells include the serving cell, and the target cell is the serving cell.

8. A method for performing a cell reselection process in a wireless communications system, the method is used in a communications apparatus camping on a serving cell, comprising:
  receiving priority information about a priority order of frequencies of candidate cells from a network operator;
  performing a cell reselection evaluation process to select a target cell from the serving cell and the candidate cells; and
  performing a cell reselection process from the serving cell to the target cell directly without passing through any intervening cell,
  wherein the cell reselection evaluation process comprises one of the following operations:
  selecting a first candidate cell as the target cell and extending an evaluation time of one or more low priority candidate cell(s), wherein a frequency of the first candidate cell has the highest priority in the priority order and the evaluation time(s) of the low priority candidate cell(s) is longer than that of the target cell;
  selecting a second candidate cell as the target cell and shortening an evaluation time of the second candidate cell, wherein a frequency of the second candidate cell has the highest priority in the priority order and the evaluation time of the target cell is shorter than one of the evaluation times of the low priority candidate cells; or
  selecting a third candidate cell as the target cell and aligning an evaluation time of each candidate cell, wherein a frequency of the third candidate cell has the highest priority in the priority order and the evaluation time of each candidate cell is adjusted according to the priority order.

9. The method as claimed in claim 8, wherein before the step of performing the cell reselection evaluation process, the communications apparatus further measures signal characteristics of the candidate cells, and one of the operations further comprises:
  simulating that the communications apparatus camps on a fourth candidate cell while still camping on the serving cell;
  evaluating a cell reselection result according to the priority order and cell reselection information; and
  determining the target cell according to the cell reselection result.

10. The method as claimed in claim 9, wherein the cell reselection information includes a threshold value of each candidate cell, the step of evaluating the cell reselection result further comprises:
  evaluating whether the cell reselection process from the fourth candidate cell to a fifth candidate cell may occur;
  determining whether a fourth signal characteristic of the fourth candidate cell falls below a fourth threshold value and determining whether a fifth signal characteristic of the fifth candidate cell exceeds a fifth threshold value, respectively, according to the priority order; and
  determining whether the fifth candidate cell is the target cell according to the determining result.

11. The method as claimed in claim 10, wherein before determining whether the fifth candidate cell is the target cell, the step of evaluating the cell reselection result further comprises:
  determining whether a fourth evaluation time of the fourth candidate cell is satisfied and determining whether a fifth evaluation time of the fifth candidate cell is satisfied, respectively.

12. The method as claimed in claim 10, wherein the cell reselection information is received from the candidate cells in advance while camping on the candidate cells.

13. The method as claimed in claim 10, wherein before the step of performing the cell reselection evaluation process, the method further includes at least one of the following steps:
  receiving the cell reselection information included in system information from the serving cell.

14. The method as claimed in claim 8, wherein the candidate cells include the serving cell, and the target cell is the serving cell.

* * * * *